United States Patent [19]
Shotbolt et al.

[11] 3,963,396
[45] June 15, 1976

[54] CLOSURE LINING MACHINE

[75] Inventors: Keith Shotbolt, Gerrards Cross, England; Gottfried Von Bismarck, Pully, Switzerland

[73] Assignee: W. R. Grace & Co., Cambridge, Mass.

[22] Filed: Feb. 5, 1974

[21] Appl. No.: 439,812

[52] U.S. Cl. .................................. 425/135; 425/110; 425/161; 425/297; 425/809; 425/DIG. 201; 156/363; 156/510
[51] Int. Cl.² .................... B32B 31/00; B29C 13/02
[58] Field of Search ........... 425/809, 161, 110, 135, 425/136, 145, 151, 297, DIG. 201; 221/26, 30; 53/129; 156/362, 363, 510

[56] References Cited
UNITED STATES PATENTS

| | | | |
|---|---|---|---|
| 3,007,197 | 11/1961 | Grover | 425/809 X |
| 3,212,131 | 10/1965 | Aichele | 425/809 X |
| 3,782,329 | 1/1974 | Everett | 425/809 X |
| 3,827,843 | 8/1974 | Blouch | 425/809 X |

*Primary Examiner*—Robert L. Spicer, Jr.
*Attorney, Agent, or Firm*—Armand McMillan; C. E. Parker

[57] ABSTRACT

A plastics introducing unit for a closure lining machine in which pellets are severed from a continuous rod and carried along part of a closed path to a transfer station where the pellets are deposited accurately centraliy of the closures to be subsequently moulded into liners for the closures.

8 Claims, 10 Drawing Figures

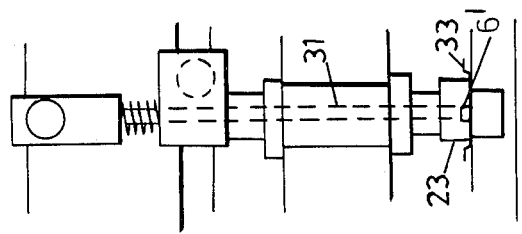
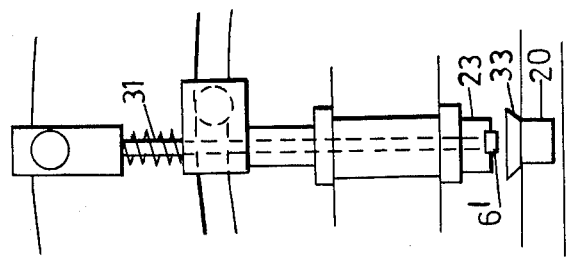
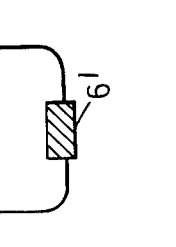
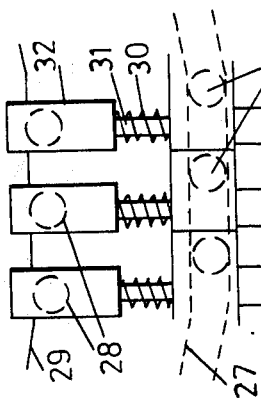
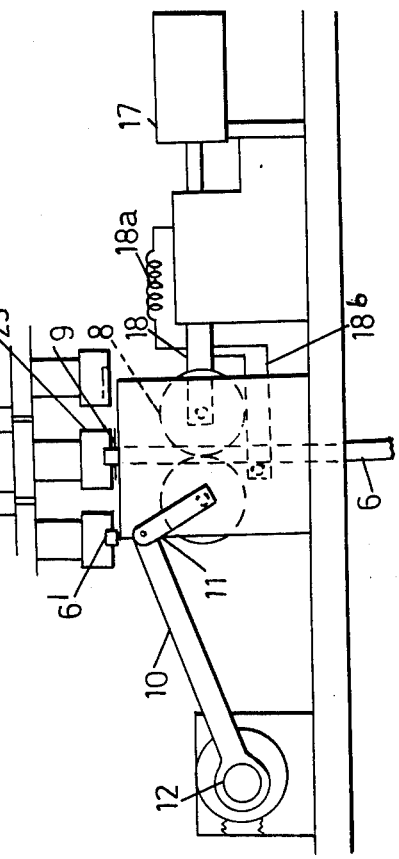

CLOSURE LINING MACHINE

The present invention relates to closure lining machines, and in particular to an improved mechanism for inserting mouldable plastics compositions into closures prior to the moulding of a liner or gasket in each closure. The closures to be used with the present invention are generally of the "small closure" type which include crown caps, "rolled-on" screw caps, and "pilferproof" screw caps. Various other types of closure of generally similar form may also be used with this machine.

Hitherto in closure lining machinery it has been customary for plastics composition to be deposited in the closures either in pasty form or in the form of a plastisol. In our British Patent Specification No. 1,199,320 there is disclosed a mechanism for inserting plastics compositions in the form of a pellet cut from a continuous rod of solid material. The present invention is concerned with the insertion of a plastics material in this rod form.

In the machine described in our said U.S. Pat. No. 1,199,320, an intermittent action was used in order to enable the closure to be stationary at the instant of insertion of the pellet.

According to the present invention, there is provided a device for feeding plastics composition to container closures for the formation of a gasket or liner in each closure, comprising a rotary turret supporting a plurality of pellet carriers for moving along a closed path, means for supplying solid pellets of plastics composition to said carriers, and means for feeding closures round said turret such that the closure feed path and the carrier path are directly above one another during the pellet transfer operation where said pellets are transferred from the carriers to the closures. In this way the position of the pellet can at all times be closely controlled in relation to the position of the closure during the insertion operation.

Preferably the pellets are fed to the carriers in the form of a continuous rod and as the leading end of the rod is picked up by a carrier it is severed from the remainder of the rod. The severing means more preferably comprises a rotary cutter timed to sever the rod as the leading end enters a pellet-receiving recess of the carrier.

Advantageously, the carriers include centraliser portions shaped to conform with the internal contours of the closures whereby the closures are accurately held in relation to the pellet during the transfer operation.

Suitably the pellet-receiving recess of the carrier consists of a keyhole slot which allows the carrier to continue its motion while the leading end of the rod moves into its path, and the moment of cut-off is timed to coincide approximately with contact of the cylindrical wall of the rod with the rear wall of the pellet-receiving recess. More suitably the pellet is held in its recess in the carrier by an interference fit assisted by the action of the cutter which rotates in a direction such that the cutter and the carrier are moving along opposite directions at the point of tangency of their respective paths of movement.

Desirably, the rod feed means may include a pair of one-way clutched rollers clutched in reverse senses of rotation, one of the rollers being positively driven during rotation of its shaft in a first direction but allowed to freewheel during rotation of its shaft in the reverse direction, and the other of the rollers being mounted to be prevented from rotating in said first direction but allowed to freewheel in said reverse direction of rotation. The two rollers thus hold between them the rod to be fed and the rod is fed upon intermittent rotation of the drive shaft of the first roller. The second roller may alternatively be positively driven for intermittent rotation in a rod advancing sense instead of merely serving to resist rotation of the second roller in said reverse direction.

In a particularly desirable form of the present invention, a sensing unit may be provided to detect the absence of a closure on the closure feed means so that no pellet will be picked up by a carrier unless that carrier will be able to deposit its pellet in a waiting closure. The closure detecting mechanism may more desirably comprise a proximity switch or other sensing device mounted over the closure feed path at a position in advance of the point of transfer of the pellets from the carrier to the closures, with the point of insertion of the pellets in the carrier in advance of the position of closure transfer to the turret by a similar path length.

In order that the present invention may more readily be understood, the following description is given, merely by way of example, reference being made to the accompanying drawings, in which:

FIG. 2 shows a side elevational view of the pellet cutting and pick-up station;

FIG. 3 is a side elevational view of one of the pellet carriers;

FIG. 4 is an underneath plan view of the carrier and pellet of FIG. 3;

FIG. 5a is a side elevational view of the carrier at the moment of arrival above a closure;

FIG. 5b is a view corresponding to FIG. 5a but showing the carrier position during insertion;

Figure 1:
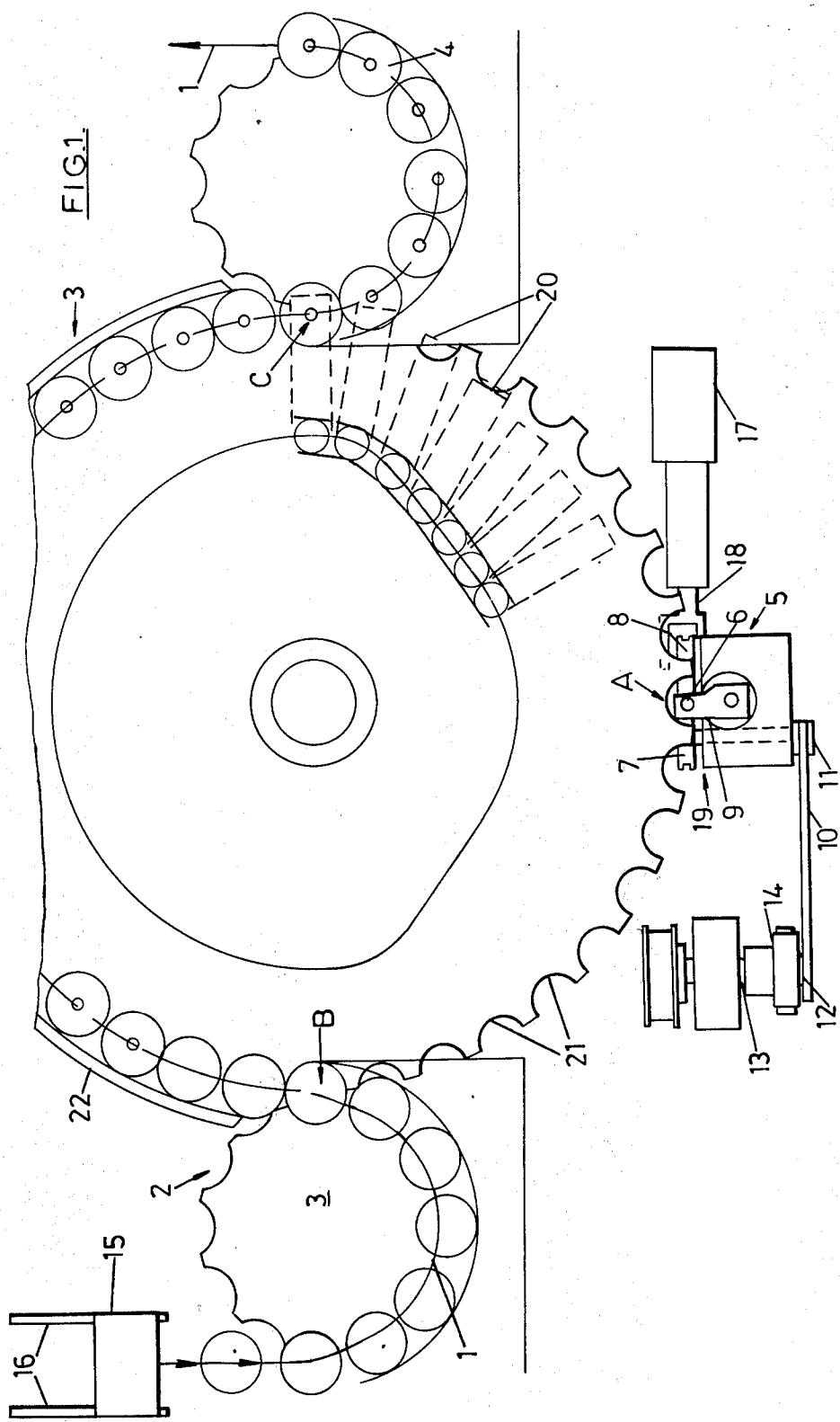
FIG. 1 is a top plan view of the turret showing the pellet cutting station and the transfer station.

Referring now to FIG. 1, there is illustrated the closure feed path 1, showing the route followed by the closures to be lined during the pellet insertion operation.

The closures, in this case crown caps, travel on a chain conveyor with their peripheral skirts projecting upwardly and pass around a primary star wheel 2 to be transferred to the turret 3 and then onto a secondary star wheel 4 from which they will in this case be advanced through a heating oven to soften the pellet before the moulding operation. Likewise, although not illustrated in the drawings, a pre-heating oven is positioned upstream of the primary star wheel 2 so as to preheat the closures causing the hard pellet to stick to the heated closure thus allowing the pellet to remain firmly in position in the centre of the closure as the inserter pin is being withdrawn. If desired, the heating oven surrounding closure feed path 1 may be dispensed with, for example by means of a heating system of the type disclosed in our copending British Patent Application No. 40045/73.

FIG. 1 shows that the closures travel round approximately one half the circumference of the turret while being carried by the turret; and that midway round the other half of the periphery of the turret is a pellet forming station 5 at which a rod 6 of solid plastics material is fed upwardly past two intermittently rotating drive rollers 7 and 8, one of which, 7, is intermittently driven and the other of which 8, is an idler roller. The upwardly projecting end of the plastics rod is severed from the remainder of the rod by a rotating cutter 9 driven in synchronism with the operation of the driven roller 7.

The driven roller 7 is driven via a crank arrangement in which a connecting rod 10 is pivotally connected at one end to the free end of an arm 11, and at the other end to a crank pin 12 which is eccentrically carried by a drive shaft 13. In order to change the film weight of the finished gasket or liner, the eccentricity of the crank pin 12 is variable by means of an adjuster mechanism 14 to be described below with reference to FIGS. 7 and 8.

As a safeguard to prevent the possibility of deposition of a pellet in the absence of a closure carried by the turret, a closure sensing device 15 is provided at a location upstream of the primary star wheel 2. This sensing device 15 is mounted above guide rails 16 so as to be adjustable longitudinally of the closure feed path to ensure that its position is in exactly the correct location to detect the absence of a closure and to signal that absence in time to over-ride operation of the feed rollers 7 and 8 to prevent advance of rod 6 past the plane of action of the cutter 9.

The sensing device 15 is a proximity switch, in this case an electrically operated switch which is sensitive to the presence of a metal object passing below the switch by being responsive to the change in inductance when such a metal arrives in register with the switch. The signal generated by the switch when a metal closure is present activates a solenoid 17 at the pellet forming station and this will in turn drive a bifurcated carrier 18 which supports the idler feed roller 8 for movement towards the driven feed roller 7 to ensure that the rod 6 is pinched between the two rollers 7 and 8 to be advanced through the plane of action of the cutter 9 when the arm 11 next pivots the drive the shaft 19 on which the driven roller 7 is mounted.

In the absence of a closure at the sensing device 15 no such signal will be generated and the solenoid 17 will not be activated, thus tension spring 18a will ensure that the idler roller 8 will be more widely spaced from the driven roller 7 than is tolerable for feed of the rod 6. Also the bifurcated carrier 18 has a hook device 18b fitted so that as spring 18a pulls the carrier 18 away from the driven feed roller 7 the compound rod 6 is positively pulled away from the driven roller. In this way, although the driven roller 7 will continue to execute its intermittent rotation, the drive to the rod 6 can be interrupted at will.

When there is a continuous stream of caps the solenoid inertia or artificial "inertia" built into the system by suitable electronic circuitry is such that the carrier 18 is always in the extended position but if a cap is absent the solenoid will be de-energised long enough for the bifurcated carrier to return to the right through the action of spring 18a thus de-activating the drive to the plastics rod 6 and this constitutes a "fail-safe" aspect of the machine.

The drive to the driven roller 7 is similar to that employed in our earlier British Patent No. 1,199,320 in that while the motion of the eccentric crank pin 12 causes the connecting rod 10 to oscillate to drive the lower, free end of the arm 11 for oscillatory pivotal motion about the axis of drive shaft 19 to the feed roller 7, the driven feed roller 7 is secured on the drive shaft 19 by a one-way clutch arrangement so that the roller 7 can only be driven positively in the rod-advancing sense.

In order that the drive shaft 19 may return during the second half cycle following such a rod-advancing movement of the drive roller 7, the one-way clutch or freewheel mechanism allows the roller 7 to remain stationary if it is held against rotation.

The drive roller 7 is for this reason positively held against rotation in the reverse sense by virtue of a similar one-way clutch or freewheel mechanism supporting the idler roller 8 on its shaft within the bifurcated carrier 18. However, the one-way clutch supporting the idler roller 8 is mounted such that the idler roller 8 freewheels when driven in a rod-advancing sense but is blocked against rotation in the reverse sense. In this way there will be no tendency for the driven roller 7 to follow its oscillatorily driven drive shaft 19 during a return stroke.

In the above description of the operation of the rollers 7 and 8, it must be borne in mind that the rotational direction of roller 7 corresponding to a rod-advance phase is opposite to the rotational direction of the idler roller 8 during a similar rod-advance phase.

The rotary turret 3 supports angularly spaced, vertically slidable pellet carriers, not shown in FIG. 1, which descend during approach towards the pellet cutting station A, then rise during travel towards the primary closure transfer station B at which the carrier and pellet are directly above the closure as the closure and pellet paths are collinear when viewed along the direction of the axis of symmetry of the closure, i.e. the vertical direction. During travel between the primary closure transfer station B and secondary closure transfer station C at which the closures are transferred onto the secondary star wheel 4, the carriers and the inserter pin 31 descend into the closures in order to engage with and hence to centralise each closure with respect to the pellet, to deposit the pellet exactly in the centre of and in contact with the pre-heated inner face of the closure, after which the outer body of the carrier rises to separate from the closure. Shortly after this, the pellet inserter pin 31 itself rises to complete the pellet insertion operation and then the carrier and the pellet inserter pin will both shortly afterwards arrive at their highest position so as to remain clear of the closure feed path at the secondary transfer station C. The detailed operation of both the pellet carrier and the pellet inserter pin will be clearly illustrated from FIG. 6 to be described below.

During this rotary motion of the carriers there is also a radially inward and outward movement of a set of anvils 20 for supporting closures to be carried by the turret 3.

The anvils 20 serve to support the individual closures on the turret during rotation between primary transfer station B and secondary transfer station C but it is clearly desirable for the anvil to be moved out of the way before the carrier descends to its lowermost position to pick up the next pellet at pick-up station A. This is because at station A the carrier will have moved down through the respective pocket 21 in the turret periphery to come very close to the rotary cutter blade 9 which must of necessity be positioned below, and clear of, the turret periphery. Thus, at this point the anvils 20 are retracted to a position radially inwardly of the pockets 21, but during rotation of the turret causing them to advance between pellet forming station A and primary transfer station B they gradually slide outwardly to arrive in a fully extended configuration at the instant of transfer of the closure from the primary star wheel 2 to the turret. At this instant the individual closures are each carried by a respective anvil and are located for motion peripherally on the turret by means of the engagement with the respective one of the pockets 21 of the turret. Similarly, the closures, will be prevented from movement radially outwardly of the turret by virtue of an arcuate guide 22 which extends over substantially the entire arc of travel of the turret between primary transfer station B and secondary transfer station C.

FIG. 2 shows more clearly the operation of the crank pin 12, connecting rod 10 and arm 11 and also shows in side elevational view the pellet forming device 5 which causes the leading end of rod 6 to be severed from the pellet 6'.

Each carrier 23 is mounted for movement vertically during its travel around the turret axis, the cam follower rollers 26 co-operating with a cam slot 27 in a fixed cam member to drive the carrier body 23 for vertical movement in accordance with the height of cam slot 27 above various positions around the axis of rotation of the turret. At the same time, various cam follower rollers 28 connected to pellet inserter pins 31 are urged upwardly against the underside of a fixed cam surface 29 by virtue of compression springs 30 arranged concentrically about the pellet inserter pins 31 to urge the cam follower body 32 upwardly away from the main pellet carrier body 23 to hold the pellet inserter pin in a raised configuration at all times except where the shape of cam surface 29 dictates that the pellet inserter pin 31 should descend to assist in ejecting the pellet from the carrier body 23.

FIG. 3 shows a side elevational view of the carrier body 23 and shows clearly the position of a pellet 6' carried thereby. Similarly, FIG. 4 shows in greater detail the form of the pellet infeed slot 24 which tapers down to a pellet holding slot 25 formed in the underside of the carrier body 23 and allowing the projecting end of the plastics rod 6 to rise up into the carrier body 23 prior to the moment of severing the pellet 6' from the rod 6.

FIG. 5a shows a side elevational view of the carrier 23, pellet 6' and pellet inserter pin 31 at the instant of arrival of the carrier and pellet combination over a closure 33 into which the pellet 6' is to be deposited. At this instant the closure 33 is supported on one of the anvils 20 of the turret.

Similarly FIG. 5b shows the same carrier and pellet combination at the instant of depositing the pellet 6' in the closure 33. Now the pellet inserter pin 31 has descended to hold the pellet in contact with the inner face of the closure 33 and the carrier body 23 is held down inside the closure to centralise the closure 33 with respect to the pellet 6' about to be released.

Figure 7:
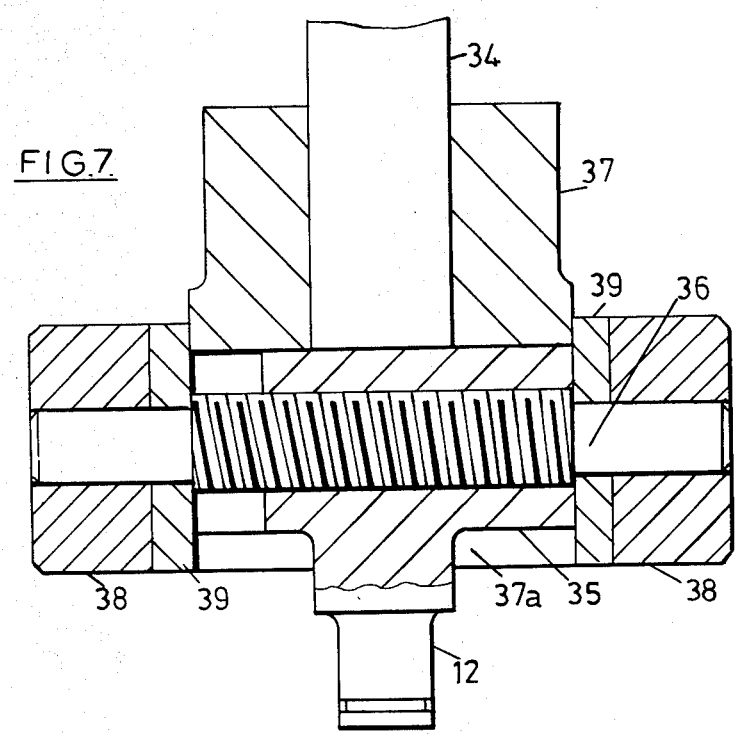
FIG. 7 is a sectional view of the plastics rod feed main drive shaft.
Figure 8:
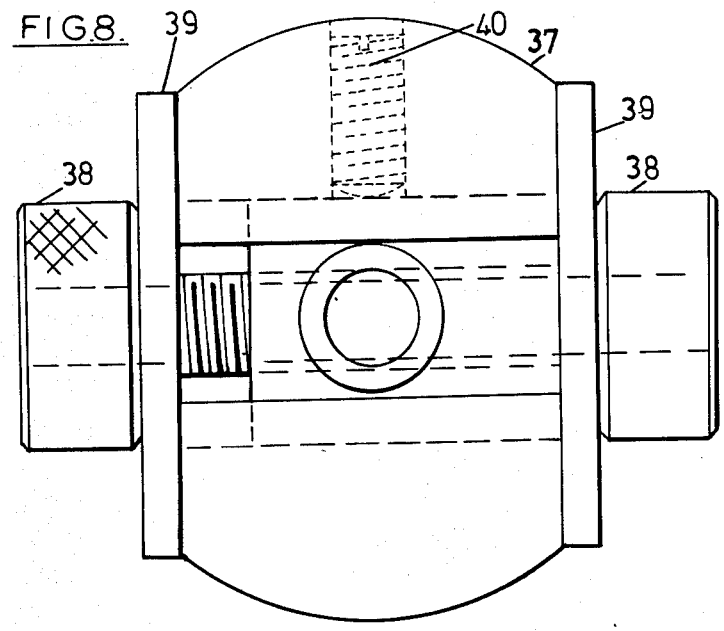
FIG. 8 is an end elevational view of the shaft of FIG. 7.

FIGS. 7 and 8 show the adjustment mechanism by means of which the eccentricity of crank pin 12 may be adjusted with respect to the axis of rotation of its own drive shaft 34 so as to vary the arc length of travel of the arm 11 and hence to vary the length of plastics rod 6 advanced by rollers 7 and 8 between successive severing operations of the cutter 9. This makes it possible to control the film weight of the eventual gasket formed at the moulding station downstream of the heating oven referred to with reference to FIG. 1.

As shown clearly in FIG. 7, the crank pin 12 is carried by an internally threaded sleeve 35 threaded on a central shaft 36, the shaft passing along a throughbore in a housing block 37 in a direction perpendicular to the longitudinal axis of the drive shaft 34. At each end the shaft 36 is provided with knurled wheels 38 which can be rotated against the throughbore-enclosing thurstplates 39 to turn the shaft 36 with resultant cooperation between the threads of sleeve 35 and shaft 36 to urge the sleeve 35 along the shaft to change the eccentricity of pin 12. The external surface of sleeve 35 is a close fit in the throughslot of the housing block, and this throughslot is slit open at 37a to accommodate lateral sliding of the pin 12.

In the FIG. 7 configuration the pin 12 is at zero eccentricity and the sleeve 35 is in its rightmost configuration. However, when the knurled wheels 38 are turned the resulting rotation of the shaft 36 causes leftward shifting of the sleeve 35 to increase the eccentricity of the pin 12 about the axis of shaft 34. Any desired eccentricity value can be chosen at will and the shaft 36 then locked into position by means of a grub screw 40 engaging in a suitable bore in the carrier 37 and having its inner tip abutting the sleeve 35.

Figure 9:
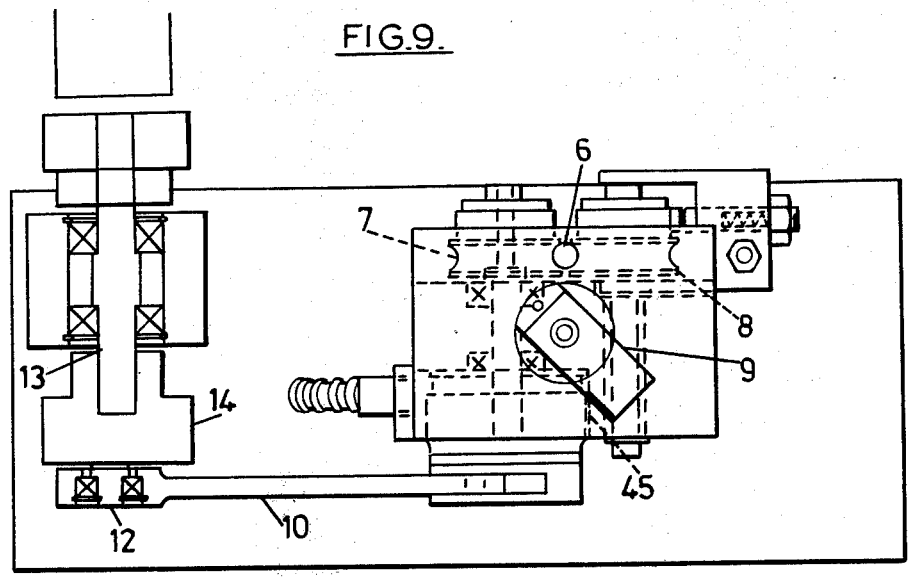
FIG. 9 is a top plan view of the plastics rod feed drive mechanism but showing an alternative form of drive cut-off when no closure is present.

FIG. 9 shows a top plan view of an alternative form of rod feed mechanism where the idler roller 8 is spring biased towards roller 7 and the drive to driven roller 7 from the connecting rod 10 and the arm 11 is by way of an electro-magnetic clutch 45 which is disengaged when the sensor 15 gives a "no closure" signal. Normally the clutch 45 will remain engaged to effect repetitive rod feed strokes.

Figure 6:
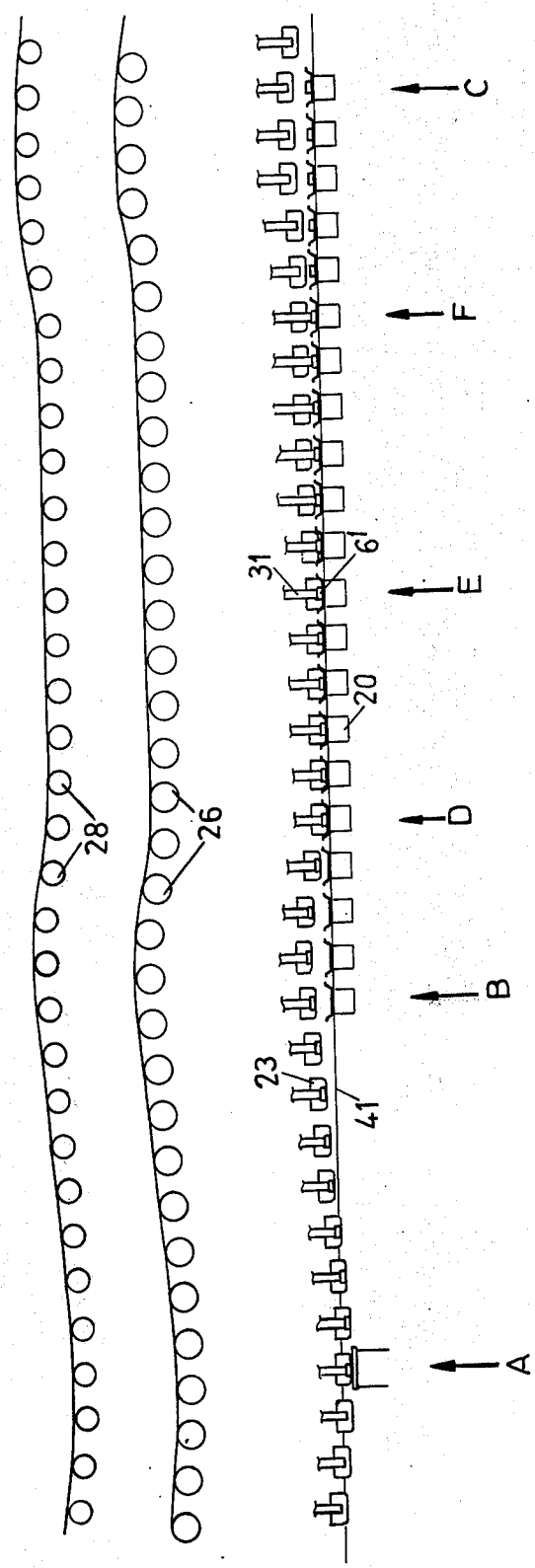
FIG. 6 is a schematic view corresponding to a development of the rotary turret and illustrating the timing of the movement of the pellet carrier, closure anvil and inserting pin.

The timing diagram of FIG. 6 shows clearly the operating sequence of a preferred form of the carrier mechanism. In FIG. 6 there is marked the pellet cutting station A and also the primary and secondary closure transfer stations B and C. Additionally, the cam follower rollers 26 for the carrier body drive cam and the cam follower rollers 28 for the pellet inserter pin cam are clearly illustrated.

The horizontal plane represented by line 41 on FIG. 6 illustrates the locus of the upper faces of the various anvils 20 and from this it can clearly be seen that the carrier body 23 descends below the anvil position during its approach to and departure from the pellet forming station A.

Between stations B and C the carrier and pellet first of all descend to enter the closure at station D from which point onwards the pellet inserter pin 31 is held down till arrival at station F where the push rod rises away from the now inserted pellet 6'. The pellet will adhere to the internal lacquer of the closure rather than to the inserter pin because the preheated closure will have a higher temperature than the cool inserter pin and this will improve adhesion between the pellet and the closure. In between stations D and F, during the pellet hold down time the carrier, pellet, closure and anvil combination will pass through station E at which separation of the carrier and the closure commences. After station F at the end of the pellet hold-down time the inserter pin rises upwardly through the carrier 23 to its normal position while the carrier 23 itself continues to rise before arrival at the secondary transfer station C where the anvil 20 once more retracts.

The timing diagram of FIG. 6 shows that as the carrier cam rollers 26 approach the pellet cut-off station A they descend to the lowest part of their movement at station A and thereafter commence a steady ascent until arrival at the primary transfer station B where the carrier is positioned above, and well clear of, the waiting closure. The descent towards station B is more rapid than that towards station A and once the roller has passed the closure centralising station D it is held down in the closure until station E where it commences a very gradual ascent out of contact with the closure. After station F the rate of ascent increases so that the roller reaches its highest point upon arrival at the secondary transfer station C where the carrier is again clear of the now loaded closure.

A similar motion is executed by the pellet inserter pin cam follower roller 28 both on the approach to the pellet cut-off station A and on the advance through the primary transfer station B to the closure centralising station D. From station D onwards the pellet inserter pin 31 must be held down until station F and for this reason the cam follower rollers 28 remain at a constant level and do not attempt to match the gradual rise of the cam follower rollers 26 between stations E and F. Consequently where, between stations F and C, the inserter and the carrier rise rapidly to clear the closure by the secondary transfer station C, the inserter pin commences its rapid rise before the increase in the rate of ascent of the carrier.

The tortuous path of travel of the closures throughout the apparatus is defined by a chain conveyor which is supported on sprockets mounted on vertical shafts and thus the chain link pins are vertical so that the chain can readily pass in a horizontal path from a closure loading station (not shown) through the preheater oven (not shown), past the closure detecting switch 15, on to a location of tangency with the primary star wheel 2 and then in the left-ward direction as viewed in FIG. 1 back to the closure loading station (not shown). A second similar chain conveyor passes tangentially the secondary star wheel 4 and carries the closures along a meandering path through the pellet softening oven (not shown) and back past a third star wheel (not shown) associated with the gasket moulding turret (also not shown) to return to the point of pick-up of loaded closures from the right-hand side of the secondary star wheel 4 in FIG. 1.

These two chains each have the upper link plates of each pair enlarged so as to provide a platform for an individual closure and provided with tabs to ensure that each closure is advanced positively along the direction of travel of the chain. Lateral guides are provided along the path of the chain so as to cause the closures to follow the intended direction of motion.

Although the machine described above is primarily intended for the feed of a rod of a mixture of polyethylene with butyl rubber, the rod may equally be in the form of any other solid, mouldable plastics material such as polyvinyl chloride.

What we claim is:

1. A mechanism for introducing a plastic composition to container closures, comprising:
    a. rotatably driveable turret means,
    b. a plurality of pellet carriers located on said turret means for movement along a closed path,
    c. feed means for supplying solid pellets of plastics composition to said pellet carriers,
    d. means for conveying closures around said turret means along a closed path,
    e. a pellet transfer station on said turret means, and
    f. means at said transfer station for transferring pellets from said pellet carriers into said closures; said closure path and said carrier closed path lying directly above one another at said pellet transfer station, wherein said means for supplying solid pellets to the carriers comprise means for advancing a continuous rod in stepwise manner, means for guiding the leading end of the rod to said carrier closed path, means on said carrier for receiving the advanced leading end of the rod, means adjacent said carrier closed path to sever the leading end of the rod from the remainder of the rod as it enters a passing carrier, and including a sensing unit to detect the absence of a closure on said closure feed means, and means responsive to sad sensing unit for disenabling said rod advancing means when the absence of a closure is detected by said sensing unit.

2. The improvement set forth in claim 1, wherein the rod advancing means includes a pair of rollers, spaced parallel shafts mounting the rollers side by side with their peripheries adjacent one another to hold the plastics rod therebetween, one-way clutch means connected operatively between the rollers and their shafts, means driving a first one of said shafts for oscillating rotary movement, and means mounting the other of said shafts fixedly, said one-way clutch means comprising a first clutch on said first shaft for allowing rotation of the associated roller in a first sense relative to the shaft but blocking relative rotation between the roller and said first shaft in the opposite sense, and a second clutch on said other shaft for allowing rotation of the accompanying roller in said opposite sense of rotation relative to the said other shaft but blocking relative rotation in the said first sense of rotation.

3. The improvement set forth in claim 1, wherein said rod advancing means include a pair of laterally spaced rollers and means for driving said rollers for intermittent rotation in a rod advancing sense while said rod is held in the space between said rollers.

4. The improvement set forth in claim 1, wherein the sensing unit comprises a proximity switch mounted over said closure feed path at a location in advance of said pellet transfer station, and wherein the section of the closure feed path between the proximity switch and the transfer station and the section of the carrier closed path between the severing means and the transfer station are of equal length.

5. The improvement as set forth in claim 1, and including an electro-magnetic clutch in said rod advancing means for disenabling drive to said advancing means, and means connecting said sensing unit to said electro-magnetic clutch.

6. The improvement set forth in claim 1, wherein the severing means comprises a rotary cutter and means effective to drive said cutter to sever the rod as the leading end thereof engages said pellet-receiving means of the carrier.

7. The improvement set forth in claim 1, wherein said pellet carriers include centraliser means shaped to conform with the internal contours of the closures to hold the closures accurately in relation to the pellet during the pellet transfer operation at the transfer station.

8. The improvement set forth in claim 1, wherein the pellet-receiving means consists of a keyhole slot in each carrier to allow the carrier to continue moving along said closed path while the leading end of the rod moves into said closed path.

* * * * *